Patented June 2, 1942

2,284,981

UNITED STATES PATENT OFFICE 2,284,981

DEHUMIDIFYING COMPOSITION AND METHOD OF PREPARING SAME

Henry Arthur Martin, Kansas City, Mo., and Carl V. Spangler, Springfield, Ohio, assignors to J. F. Pritchard and Company, Kansas City, Mo., a corporation of Missouri No Drawing. Application November 20, 1939, Serial No. 305,316

4 Claims. (Cl. 252—194)

This invention relates to a composition for dehumidifying air or other gases, and to a method of preparing the same.

The principal objects of the invention are to increase the adsorption capacities of adsorbents; and to provide a porous hygroscopic substance of stable form and high structural strength so that when placed in a bed, there is no tendency for adhesion of the particles and the voids remain constantly uniform, consequently the bed maintains its original flow capacity and there is no progressive retardation of the gas flow therethrough.

Other objects of the invention are to provide a dehumidifying substance which is capable of being repeatedly regenerated by heating without apparent alteration of its physical properties, including affinity for moisture; and to provide a dehumidifying composition which acts both as an absorber and an absorbent.

In accomplishing these and other objects of the invention, we contemplate a prepared composition including a non-deliquescent absorber and adsorbent material combined with a deliquescent hygroscopic material in such a manner that the resultant product has stable physical properties and has an extremely high affinity for moisture and moisture retention capacity.

In carrying out the invention, the adsorbent substance is one having high ultimate strength and of maximum porosity so that it is capable of retaining the deliquescent hygroscopic material without crushing, for example, fuller's earth, activated bauxite, silicate jell, or like adsorbent. These adsorbents result in a product of the desired porosity and structural strength and are completely stable under conditions encountered incidental to the dehumidification of air or gas.

The deliquescent material contemplated is manganous chloride, as this material is highly deliquescent and results in a product which is odorless, non-poisonous, stable at regenerative temperatures, and relatively non-corrosive to common metals used in the construction of dehumidifying equipment.

In producing the compound, the adsorbent material, such as activated bauxite, is placed in a vessel of convenient size and shape and a saturated or partly saturated solution of manganous chloride is poured over it until it is completely or partially immersed. After impregnation of the activated bauxite with the solution, the excess solution is drained off.

Another method of impregnating the activated bauxite is to place it in a screen basket, or other perforated container, and dip it into the manganous chloride solution. After the solid material, activated bauxite, has become sufficiently impregnated with the solution, the excess solution is drained off. The time required for full impregnation is variable with the structure of the adsorbent, the temperature, and other factors.

Another method of effecting impregnation is to place the adsorbent material in a cylindrical drum, or a modified concrete mixer, which is rotated in a manner so that fresh surfaces of the material are constantly being presented as the rotation proceeds. During rotation the changing surfaces are exposed or sprayed with a complete or partially saturated water solution of manganous chloride, the solution being adsorbed and absorbed into the porous physical structure of the adsorbent material. This method is, perhaps, more economical since it is not necessary to prepare and recover the excess amount of solution required for the dipping process. It is obvious that the relative strength of the solution may be varied in order that the capacity of the resultant material may be controlled.

After the impregnated material is processed in accordance with one of the above methods, it is placed in an oven and heated until the free moisture and water are evaporated or driven out of the mixture, leaving the impregnating material, manganous chloride, within the pores of the adsorbent material. The temperature to which the material may be heated should be within the limitations of 300° to 500° F. to effect complete stable impregnation without overheating. The time element in the heating will vary with the quality of the material, heating efficiency, and other factors.

After preparation, the material should be placed in substantially air-tight containers so that it is preserved until ready for use.

In use, the particles of prepared material are placed in the customary dehydration equipment so that the voids therebetween form passageways for the air or gases to be dried. The moisture in the air or gases, upon contacting the particles, will be adsorbed and absorbed in the pores thereof in amount limited by the capacity of the material. The impregnating element, manganous chloride, is highly hygroscopic and deliquescent, so that additional moisture is absorbed thereby. The strength of the particles, even when saturated, is sufficiently high to prevent breaking thereof under weight of the upper particles on the lower particles so that there is no reduction in flow capacity of the voids therebetween. The manganous chloride, being contained in the structurally sound particles of adsorbent material, retains the absorbed moisture and there is no physical change in the contour of the particles.

Since manganous chloride is relatively inert to materials other than water, and does not appreciably hydrolyze under use, no chemical action occurs in the presence of the gas that tends to be corrosive to the metal parts of the equipment.

As the particles of the composition approach saturation, they, similarly to other absorbent materials, gradually lose their dehumidifying efficiency. Since the particles are usually arranged in beds, with the gases passed upwardly therethrough, a zone of adsorption is formed at the bottom which effectively drys the gas. As this portion gradually absorbs moisture, the zone of absorption moves progressively upward through the bed until it emerges at the top, and when the complete bed becomes saturated it is no longer active. The thickness of the zone and its rate of travel through the bed depend upon a variety of factors, such as the size or mesh of the particles, the linear velocity of the gases, the temperature, pressure, absolute and relative humidity of the gases, and other factors. When the material becomes saturated it is regenerated by driving off the contained moisture through the application of heat. When sufficiently dry and cooled the bed is again ready for reuse.

When the material is regenerated, it is restored to its original moisture collecting properties and is capable of collecting moisture in any phase in which it may be carried with the gases.

The material formed in accordance with the present invention may be used continuously and repeatedly regenerated from time to time without apparent alteration in any of its physical properties other than appearing slightly damp, when saturated.

From the foregoing it is obvious that we have increased the capacity of an adsorbent such as activated bauxite to remove water from air or other gases.

What we claim and desire to secure by Letters Patent is:

1. A dehumidifying composition capable of being reactivated after use, by application of heat, to restore moisture absorbent and adsorbent properties thereof consisting of activated bauxite impregnated with manganous chloride.

2. A dehumidifying composition capable of being reactivated after use, by application of heat, to restore moisture absorbent and adsorbent properties thereof consisting of a porous adsorbent material of the class including activated bauxite, and manganous chloride contained in the pores of said adsorbent material.

3. The process of preparing a dehumidifying composition capable of being reactivated after use, by application of heat including, impregnating activated bauxite with a manganous chloride solution, and evaporating the liquid component of said solution.

4. The process of preparing a dehumidifying composition capable of being reactivated after use, by application of heat including, impregnating bauxite with a saturated solution of manganous chloride, and evaporating the liquid component of said solution.

HENRY ARTHUR MARTIN.
CARL V. SPANGLER.